Feb. 22, 1944.  G. G. GRIGSBY  2,342,192
FLEXIBLE PIPE COUPLING
Filed March 28, 1941   2 Sheets-Sheet 1

Inventor
Gail G. Grigsby
by John H. Cassidy
His Attorney.

Feb. 22, 1944.        G. G. GRIGSBY            2,342,192
                   FLEXIBLE PIPE COUPLING
             Filed March 28, 1941        2 Sheets-Sheet 2
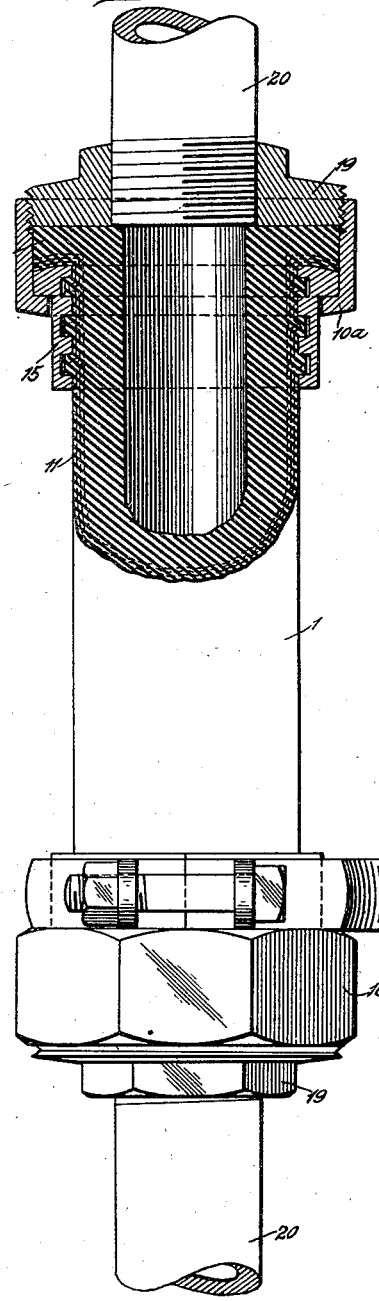
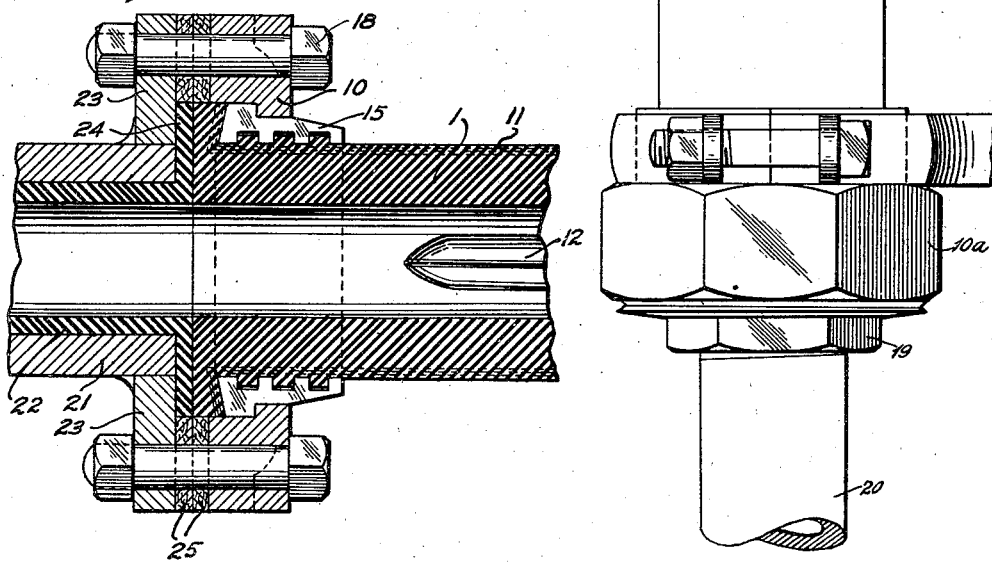
Inventor
Gail G. Grigsby
by John H. Cassidy
His Attorney Patented Feb. 22, 1944

2,342,192

UNITED STATES PATENT OFFICE 2,342,192

FLEXIBLE PIPE COUPLING

Gail G. Grigsby, Desloge, Mo.

Application March 28, 1941, Serial No. 385,635

3 Claims. (Cl. 285—71)

This invention relates to a pipe coupling for flexible pipes, to the method and apparatus for producing the same, and to a use thereof.

An object of this invention is to provide an efficient coupling for flexible pipe and one which will withstand high pressures. The coupling of this invention is particularly adapted to valves of the type described in my Patent No. 2,212,733, issued August 27, 1940, but its utility is not limited to that environment.

Further objects and advantages of the invention will be apparent from the following detail description taken in connection with the accompanying drawings, in which—

Fig. 3 is a view partly in section showing one application of a coupling; and

Fig. 4 is a sectional view illustrating an application of the coupling.

Figure 2:
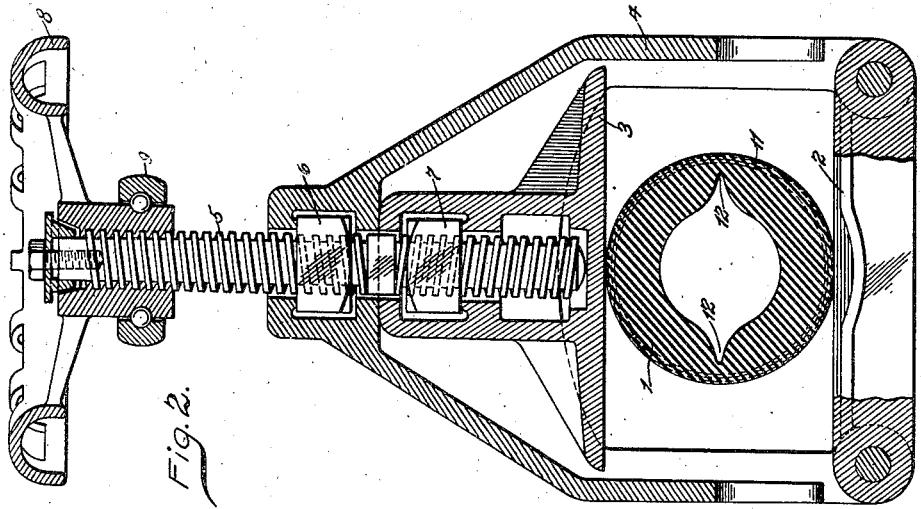
Fig. 2 is a vertical section on line 2—2, Fig. 1.
Figure 1:
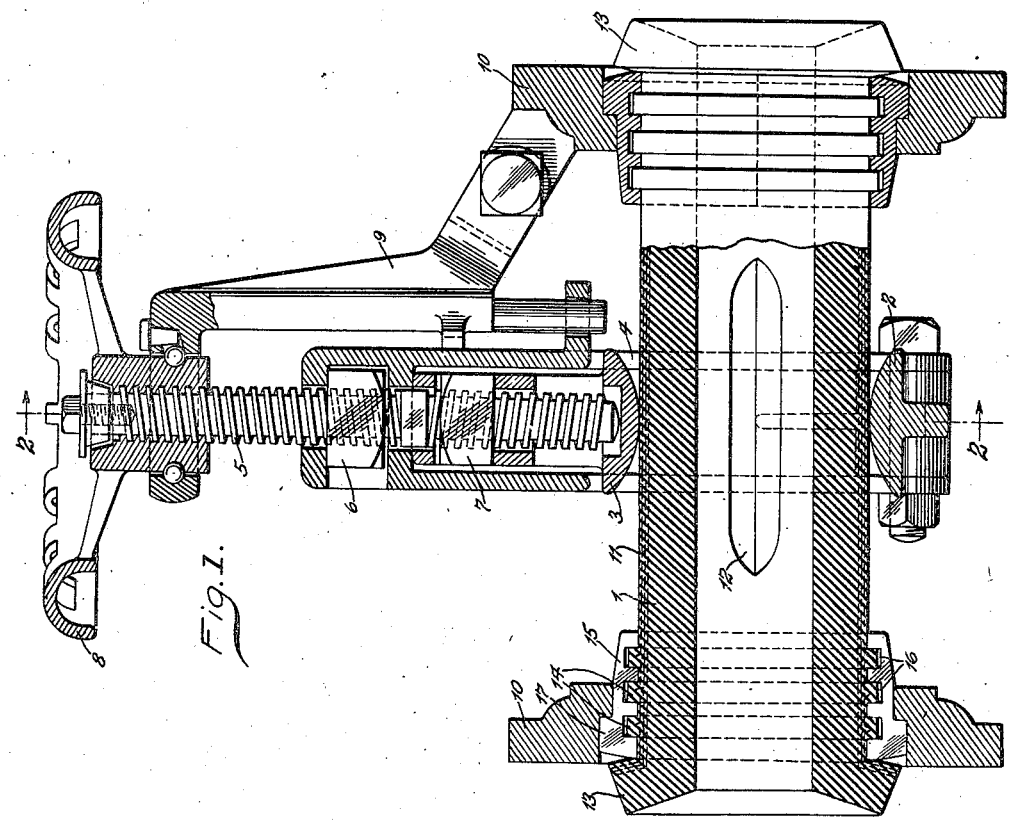
Fig. 1 is a side elevation of a valve partly in section employing a flexible conduit.

The valve illustrated in Figs. 1 and 2 is a valve of the general type shown in my Patent No. 2,212,733, issued August 27, 1940, and includes a flexible conduit 1 and mechanical means for collapsing the conduit, including a bottom clamp 2, a top clamp 3, a yoke 4 connected to the bottom clamp, and a jack screw 5 with threads in one direction on the top portion and threads of opposite direction on the bottom portion, with follower nuts 6 and 7, associated respectively with the yoke and top clamp, whereby upon rotation of the screw by a hand wheel 8 the yoke 4 and top clamp 3 will be moved toward or from each other simultaneously.

These mechanical elements are supported by a bracket 9 from a ring 10 which forms a part of the end coupling.

The conduit 1 comprises rubber reinforced by layers of fabric 11 about its periphery. The conduit has internally diametrically opposed grooves 12, 90° removed from the point of contact between the conduit and the clamps and forming hinge lines.

The pipe coupling includes a circumferentially extending flange 13 at the end of the pipe or conduit, and one or more (three as shown in the drawings) circumferential ridges 14 spaced rearwardly from the circumferential flange 13. The fabric reinforcement 11 extends about the periphery of the conduit and into the flange 13 and outwardly therewith, as clearly shown in Fig. 1.

The conduit is constructed of rubber, either natural or synthetic, and the word "rubber" as used herein is intended to include both natural and synthetic rubbers.

The coupling includes a sleeve 15, positioned about the conduit and adjacent the flange 13, with its end abutting the flange and having internal circumferential grooves 16 to receive the ridges 14.

A ring 10 engages an outwardly extending circumferential flange 17 on the sleeve and provides means whereby the coupling may be connected endwise with a second conduit. As shown in Figs. 1 and 4, the ring 10 has a circumferential flange with holes therethrough to accommodate clamping bolts 18. In the embodiment shown in Fig. 3, the ring is identified as 10a, and comprises an internally threaded nut to engage an externally threaded flange 19 on a pipe.

It will be apparent that the sleeve 15 and the ring 10 may be integral. However, in order to provide for ready replacement of the conduit 1, an arrangement is provided in which the sleeve 15 is split into two complementary sections held together by the ring 10. Thus, if replacement is desired the ring 10 may be loosened and removed and the sleeve 15 taken off in halves. Then the sleeve can be reassembled on the new conduit, the ring put in position and clamped in place. It will be seen, therefore, that with the split sleeve and separate ring the pipe of conduit section can be readily replaced without disturbing the remaining portion of the line.

In Fig. 3 a particular construction is shown in which the conduit 1 is attached to a metal pipe 20 having screwed or welded to it a flange member 19. In the embodiment shown in Fig. 4 a connection is made between the conduit 1 and a pipe 21 having a rubber lining 22 and a welded-on flange 23. In this case the lining is brought outwardly over the ends of the pipe forming an outwardly extending rubber flange 24. Here the bolts 18 pass through the flange 23 and the ring 10, thereby clamping together the out-turned rubber flanges. Gaskets or washers 25 are provided and limit the clearance between the end of the pipe 21 and the end of the sleeve 15.

The valve which has been produced using a flexible conduit of rubber or its equivalent, and with connections as illustrated and described, is particularly desirable in handling fluids which are either abrasive or corrosive. It is of particular utility in milling ores, for the handling of slimes and sands which would soon cut and destroy the parts of metal valves. It is also of value in the chemical industry where the chemicals handled are corrosive as to metals but are neutral as to rubber. As shown in Fig. 4, it may be connected to a typical rubber lined pipe so that no metal parts whatever are exposed to the action of the fluids handled.

It will be obvious that the invention accomplishes its objects. Various changes may be made in the details of construction and operation, within the scope of the appended claims, without departing from the spirit of this invention, and parts of the invention may be used without the whole.

I claim:

1. In a pipe coupling, the combination comprising a flexible rubber conduit having a circumferential flange at its end and one or more circumferential ridges on its periphery spaced from the flange, a sleeve about the conduit having its outer end abutting the flange and having one or more internal grooves receiving said ridges, and a ring about and engaging the sleeve adapted for connection endwise with a second conduit, arranged whereby the flange is clamped between the end of the sleeve and an annular face on said second conduit.

2. In a pipe coupling, the combination comprising a flexible rubber conduit having a circumferential flange at its end and one or more circumferential ridges on its periphery spaced from the flange, said conduit being of rubber with fabric reinforcement about its periphery and extending into the flange and outwardly therewith, a sleeve about the conduit having its outer end abutting the flange and having one or more internal grooves receiving said ridges, and a ring about and engaging the sleeve adapted for connection endwise with a second conduit, arranged whereby the flange is clamped between the end of the sleeve and an annular face on said second conduit.

3. In a pipe coupling, the combination comprising a flexible conduit having a circumferential flange at its end and one or more circumferential ridges on its periphery spaced from the flange, a split sleeve about the coupling having its outer end abutting the flange, having one or more internal grooves receiving said ridges and having an outwardly extending flange near its outer end, and a ring about the sleeve engaging the inner edge of the flange on the sleeve and adapted for connection endwise with a second conduit, arranged whereby the flange on the end of the conduit is clamped between the end of the sleeve and an annular face on said second conduit.

GAIL G. GRIGSBY.